(12) United States Patent
Inui et al.

(10) Patent No.: US 7,150,338 B2
(45) Date of Patent: Dec. 19, 2006

(54) COVER SUPPORTING STRUCTURE FOR LIGHT VEHICLE

(75) Inventors: Hiroatsu Inui, Wako (JP); Kazuhisa Takemoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/064,678

(22) Filed: Feb. 24, 2005

(65) Prior Publication Data
US 2005/0211485 A1   Sep. 29, 2005

(30) Foreign Application Priority Data
Feb. 25, 2004   (JP) ............................. 2004-049165

(51) Int. Cl.
*B62D 61/02* (2006.01)

(52) U.S. Cl. .................................................... 180/219
(58) Field of Classification Search ................. 180/219
See application file for complete search history.

(56) References Cited

FOREIGN PATENT DOCUMENTS

| JP | 59-31589 | | 2/1984 |
| JP | 2003083162 | | 3/2003 |
| JP | 2003083162 A | * | 3/2003 |

* cited by examiner

*Primary Examiner*—Lesley D. Morris
*Assistant Examiner*—Marlon Arce-Diaz
(74) *Attorney, Agent, or Firm*—Hamre, Schumann, Mueller & Larson, PC

(57) ABSTRACT

A cover supporting structure for a light vehicle is provided in which the cover which covers a part of a power unit is supported by the power unit or a supporting member in a plurality of supporting portions.

5 Claims, 6 Drawing Sheets

COVER SUPPORTING STRUCTURE FOR LIGHT VEHICLE

FIELD OF THE INVENTION

The present invention relates to a cover supporting structure for a light vehicle, in which a cover which covers a part of a power unit mounted on a frame is supported, in a plurality of supporting portions, by the power unit or a supporting member which is disposed around the power unit.

BACKGROUND OF THE INVENTION

Japanese Patent Laid-Open No. S59-31589 discloses that a plurality of portions of a cover, which covers a part of a power unit mounted on a frame of a motorcycle which is a light vehicle, are fastened to the power unit or the frame via bolts. Japanese Patent Laid-Open No. 2003-83162 discloses a plurality of engaging protrusions, which are provided to a cover which covers a part of an engine in a power unit, elastically engaged with the engine in a removable manner.

However, when the cover is fastened to the power unit or the peripheral member of the power unit via bolts in a plurality of portions as disclosed in Japanese Patent Laid-Open No. S59-31589, it takes a long time to attach the cover. Moreover, in a case where the cover is directly attached to the power unit or the supporting member, when the cover is made of synthetic resin, it is necessary to take care not to cause deformation of the cover due to the fastening. On the other hand, with one in which engaging protrusions provided in a plurality of portions of the cover elastically engage the power unit or a supporting member as disclosed in Japanese Patent Laid-Open No. 2003-83162, the attaching is made easy, and does not cause deformation even when the cover is made of synthetic resin. However, there is a possibility that the cover is detached by a small external force or the like.

The present invention is made in consideration of the above circumstances. It is an object of the present invention to provide a cover supporting structure for a light vehicle with which the attachment of the cover is made relatively easy, and the cover is not detached easily.

SUMMARY OF THE INVENTION

For the purpose of achieving the above described object, a first aspect of the invention is a cover supporting structure for a light vehicle, in which a cover which covers a part of a power unit mounted on a frame is supported by the power unit or a supporting member which is disposed around the power unit in a plurality of supporting portions, the cover supporting structure characterized in that, in at least one supporting portion out of the supporting portions, the cover is elastically supported by a bolt which is inserted into the cover and is screwed onto the power unit or the supporting member; and, in each of the remaining supporting portions out of the plurality of supporting portions with the supporting portion in which the bolt is disposed excluded, a supporting protrusion, which is provided, in a protruding manner, to one of the cover and either the power unit or the supporting member, is elastically inserted into an elastic member, which is fitted into the other of the cover and either the power unit or the supporting member.

With the first aspect of the invention, in one portion, which is one of the plurality of supporting portions which are set on the cover, the cover is attached via the bolt, and in each of the remaining supporting portions, the supporting protrusion is elastically inserted into the elastic member. As a result of this structure, the work of attaching the cover is made easy compared to one which requires the work of fastening for all of the supporting portions. Moreover, since the cover is elastically supported by the bolt, even when the cover is made of synthetic resin, it is made possible to prevent the occurrence of deformation of the cover due to fastening of the bolt.

A second aspect of the invention is characterized in that, in at least one supporting portion out of the remaining supporting portions, coming-off prevention means is provided between the supporting protrusion and the elastic member, the coming-off prevention means keeping the elastically inserted state of the supporting protrusion in the elastic member, in addition to the configuration of the first aspect of the invention.

With the second aspect of the invention, when the cover is removed, it is necessary to loosen the bolt, while, in at least one supporting portion out of the remaining supporting portions, the elastically inserted state of the supporting protrusion in the elastic member is kept by the coming-off prevention means. Accordingly, it can be avoided that the remaining supporting portions easily comes off by a small external force or the like.

A third aspect of the invention is characterized in that the supporting portion in which the bolt is disposed is set in the lower portion of the cover, which covers a lower portion of the power unit; and, in each of the remaining supporting portions, which are set above the supporting portion in which the bolt is disposed, the supporting protrusion is provided onto the inner surface of the cover in a protruding manner, and the elastic member is fitted into the power unit or the supporting member, in addition to the configuration of the first or second aspect of the invention.

With the third aspect of the invention, the supporting portions of the cover are made difficult to see from the outside by disposing the bolt, which can be seen from the outside, in the lower portion of the cover, and by providing the supporting protrusions onto the upper inner surface of the cover in a protruding manner. Thus, it is made possible to improve the external appearance.

Furthermore, a fourth aspect of the invention is characterized in that the coming-off prevention means is formed by inserting a pin, which engages with the elastic member, into a portion of the supporting protrusion, the portion protruding from the elastic member, in addition to the configuration of the second or third aspect of the invention. The coming-off prevention means can be constructed simply by simple parts.

DETAILED DESCRIPTION OF THE INVENTION

A description will be given below of embodiments of the present invention on the basis of examples of the present invention which are shown in the accompanying drawings.

Figure 1:
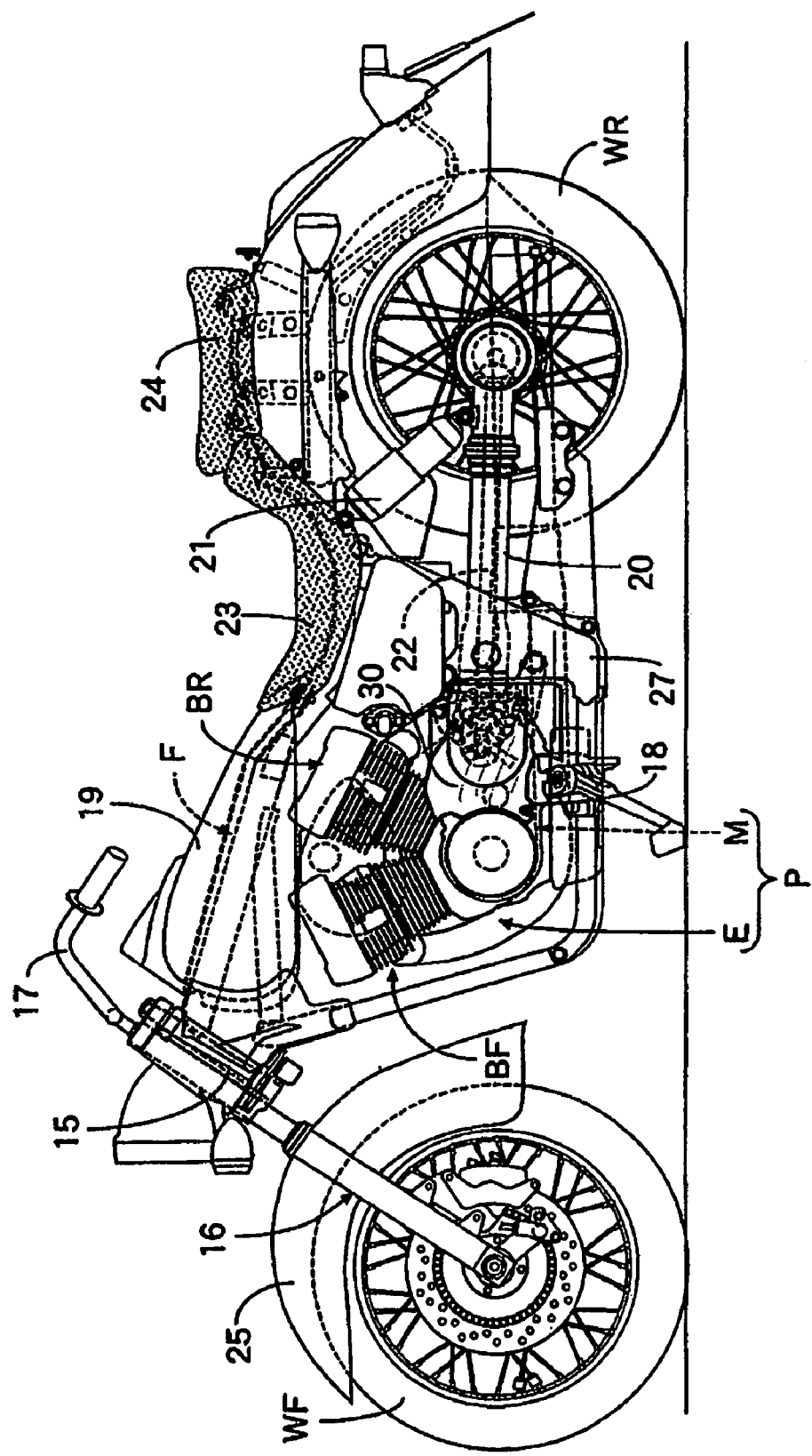
FIG. 1 is a side view of a motorcycle of a first example.
Figure 2:
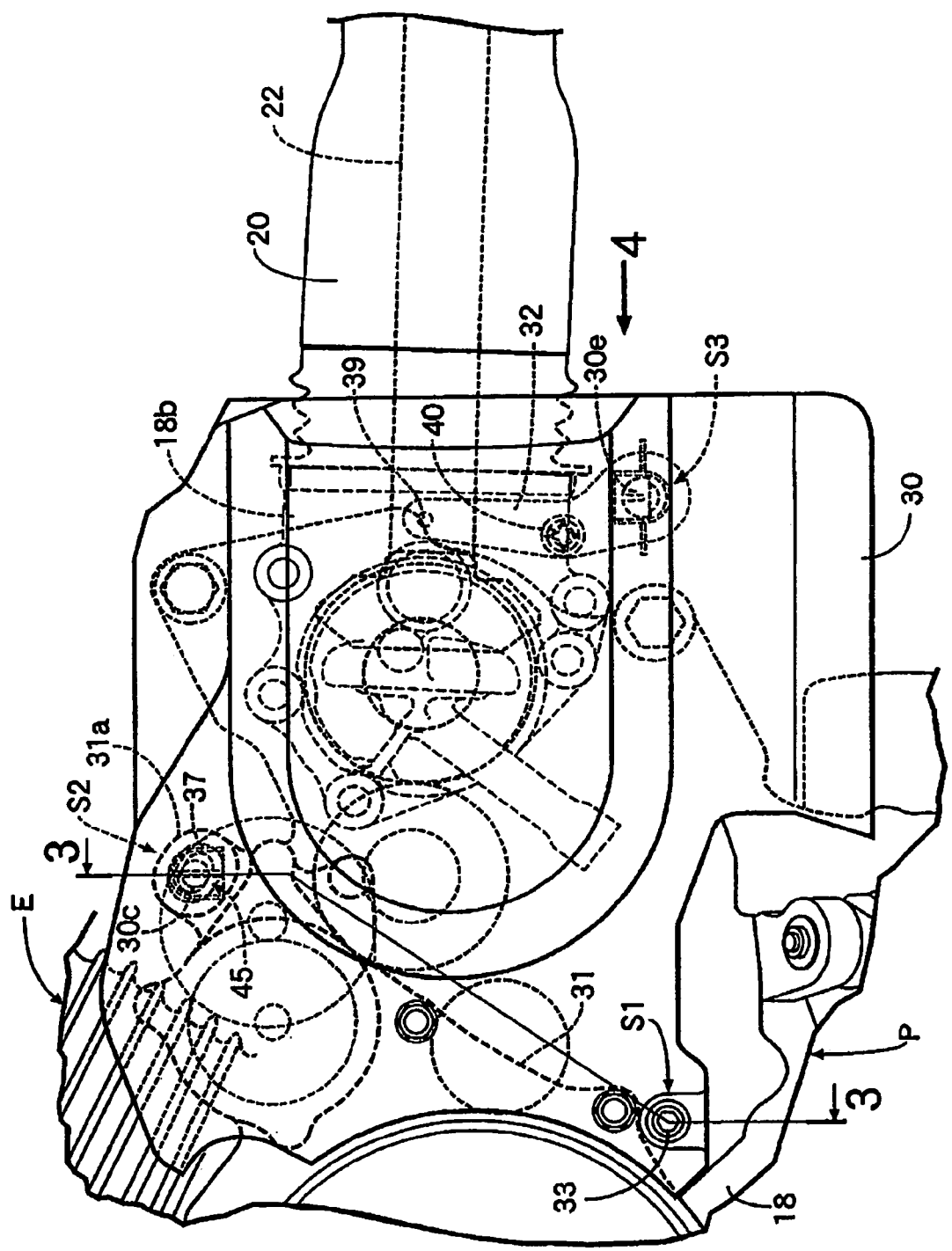
FIG. 2 is a main part enlarged view of FIG. 1.
Figure 3:
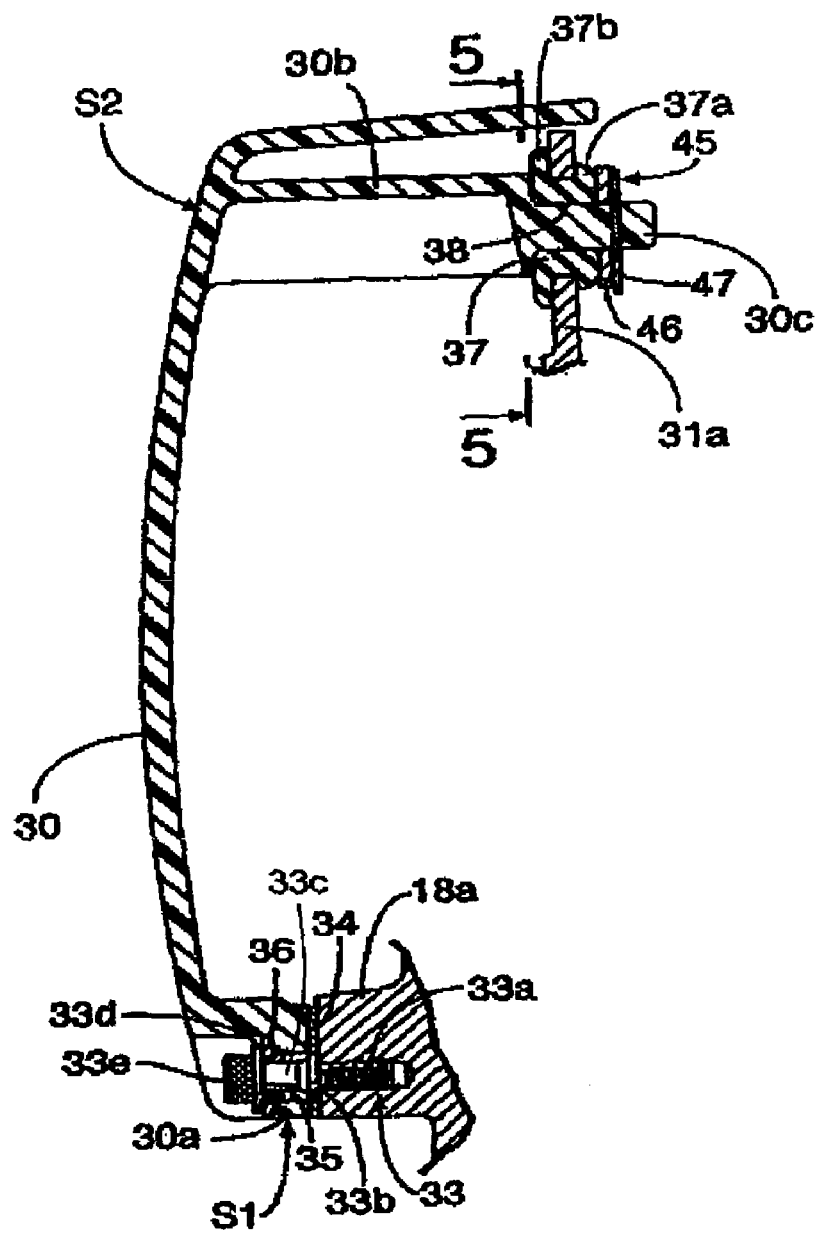
FIG. 3 is a cross section taken along the line 3—3 of FIG. 2.
Figure 4:
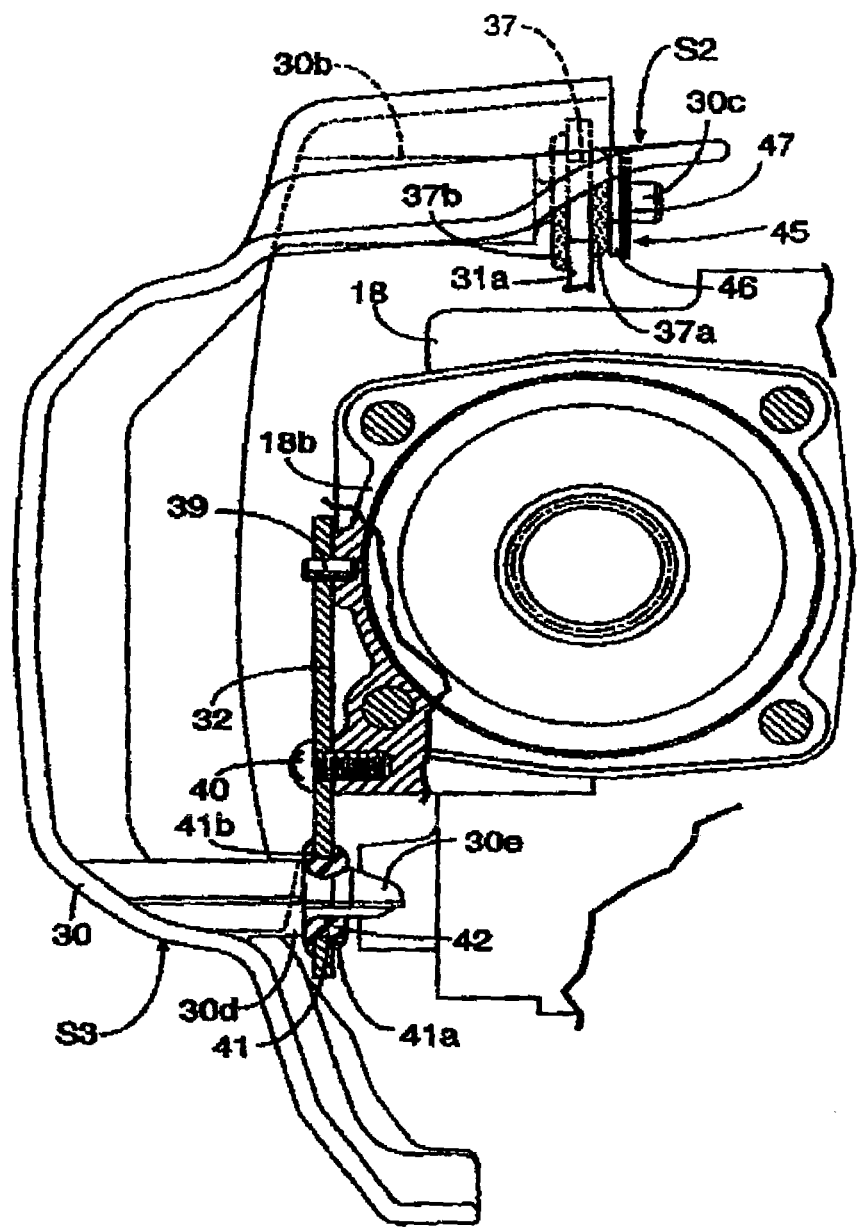
FIG. 4 is a view on the arrow 4 of FIG. 2.
Figure 5:
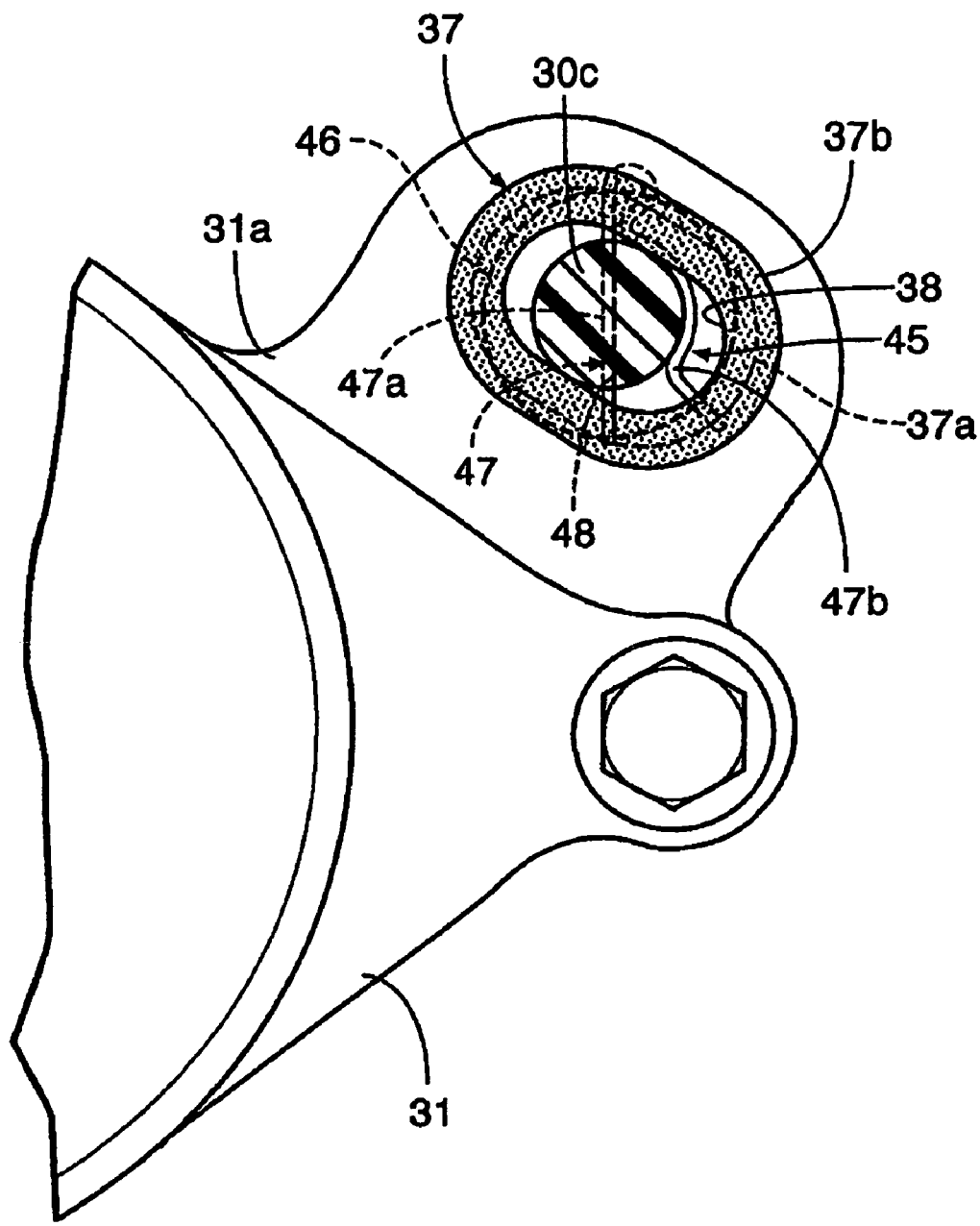
FIG. 5 is an enlarged cross section taken along the line 5—5 of FIG. 3.

FIGS. 1 to 5 show a first example of the present invention. FIG. 1 is a side view of a motorcycle. FIG. 2 is a main part enlarged view of FIG. 1. FIG. 3 is a cross section taken along the line 3—3 of FIG. 2. FIG. 4 is a view on the arrow 4 of FIG. 2. FIG. 5 is an enlarged cross section taken along the line 5—5 of FIG. 3.

First, in FIG. 1, a head pipe 15 provided to the front end of a frame F of the motorcycle, which is a light vehicle, steerably supports a front fork 16, which pivotally supports a front wheel WF, and a steering handle 17 is coupled to the front fork 16. In the front portion of the frame F, a power unit P is mounted, the power unit P being constituted of a V-type engine E, in which a front bank BF and a rear bank BR are arranged in an approximately V-shape, and a transmission M, which is housed in a crankcase 18 which the engine E includes. A fuel tank 19 is mounted in the front portion of the frame F in a way that the engine E is covered therewith from above.

The frame F is provided with a pair of left and right pivot plates 27, 27, which are disposed rearward of the power unit P. The front portion of a pair of left and right swing arms 20, 20, which extend in the fore-and-aft direction, is swingably supported by the pivot plates 27, 27. A rear wheel WR is pivotally supported between both swing arms 20, 20. In addition, rear cushion units 21, 21 are inserted between the frame F and both swing arms 20, 20, respectively. In addition, between both swing arms 20, 20, the left swing arm 20 is formed in a cylindrical shape, and a drive shaft 22 for transmitting power from the power unit P to the rear wheel WR is housed in the left swing arm 20.

A main seat 23 on which a rider sits is mounted on the frame F rearward of the fuel tank 19. A pillion seat 24 for a passenger is mounted on the frame F rearward of the main seat 23.

A front fender 25 which covers the front wheel WF from above is attached to the front fork 16. A rear fender 26 which covers the rear wheel WR from above is attached to the rear portion of the frame F.

In FIG. 2, the left side of the rear portion of the crankcase 18 in the engine E of the power unit P is covered with a cover 30 made of synthetic resin, for example. A plurality of supporting portions which are set on the cover 30, first to third supporting portions S1 to S3 in this example, are supported by the crankcase 18 in the power unit P, a crankcase cover 31 which covers a part of the left side face of the crankcase 18, and a stay 32 as a supporting member which is attached to the crankcase 18 in a way that the stay 32 is disposed around the power unit P.

The first supporting portion S1, which is at least one of the first to third supporting portions (one portion in this example), is set on the front end side of the cover 30 in the lower portion thereof. In the first supporting portion S1, the cover 30 is elastically supported by a bolt 33, which is inserted into the cover 30 and is screwed onto the crankcase 18 in the power unit P.

In FIG. 3, an attachment boss 18a is integrally provided in the lower portion of the crankcase 18 in a way that the attachment boss 18a protrudes toward the cover 30 side, the boss 18a corresponding to the first supporting portion S1. On the other hand, a support portion 30a, which sandwiches an annular washer 34 between the support portion 30a and the attachment boss 18a, is provided in the lower portion of the cover 30 in the first supporting portion S1 in a way that a part of the cover 30 is recessed inward. The support portion 30a is provided with a support hole 35.

The bolt 33 integrally includes, in the following order from one end side thereof, a screw shank portion 33a which is screwed onto the attachment boss 18a; a contacting collar portion 33b which extends radially outward from the other end of the screw shank portion 33a, and comes into contact with an end surface of the attachment boss 18a; a shank portion 33c which is coaxially joined to the contacting collar portion 33b in a way that the shank portion 33c is inserted through the support hole 35; a flange portion 33d which extends radially outward from the other end of the shank portion 33c; and a manipulation portion 33e which is continuously provided onto the flange portion 33d. The contacting collar portion 33b has a diameter such that the contacting collar portion 33b can be inserted through the support hole 35 and the washer 34, and is formed thinner than the washer 34. The flange portion 33d is formed in a diameter larger than that of the support hole 35.

Between the flange portion 33d of the bolt 33 and the support portion 30a of the cover 30, a grommet 36, which is formed of elastic material in a cylindrical shape, is inserted in a way that a part of the grommet 36 is inserted into the support hole 35. By forcing the contacting collar portion 33b of the bolt 33 through the grommet 36, the grommet 36 is held on the shank portion 33c of the bolt 33 when the bolt 33 is removed.

Referring to FIGS. 4 and 5, among the first to third supporting portions S1 to S3, the second and third supporting portions S2 and S3, which are the remaining supporting portions with the first supporting portion S1 in which the bolt 33 is disposed excluded, are set above the first supporting portion S1. In addition, in the supporting portions S2 and S3, supporting protrusions 30c and 30e, which are provided, in a protruding manner, to one of the cover 30 and either the power unit P or the supporting member which is disposed around the power unit P, are elastically inserted through grommets 37 and 41, which are elastic members and fitted into the other of the cover 30 and either the power unit P or the supporting member. In the first example, in the second supporting portion S2, the supporting protrusion 30c which is provided onto the inner surface of the cover 30 in a protruding manner is elastically inserted into the grommet 37 which is fitted into a bracket 31a integrally provided to the crankcase cover 31. In the third supporting portion S3, the supporting protrusion 30e which is provided onto the inner surface of the cover 30 in a protruding manner is elastically inserted into the grommet 41 which is fitted into the stay 32 as a supporting member attached to the crankcase 18.

The second supporting portion S2 is set in the middle of the cover 30 in the fore-and-aft direction in the upper portion thereof. The grommet 37 is fitted into the bracket 31a in a portion corresponding to the second portion S2, the grommet 37 being formed of elastic material in a cylindrical shape in a state where the grommet 37 has, on both ends thereof, collar portions 37a and 37b which engage with both sides of the bracket 31a. In addition, the grommet 37 is formed into a shape which has an oval cross section, the major axis direction of which is a tangential direction of an imaginary circle the center of which is the axis of the bolt 33. An insertion hole 38 which is formed by the inner face of the grommet 37 also has an oval cross section.

On the other hand, on the inner face of the cover 30 in the second supporting portion S2, a contacting protrusion 30b, which allows the tip thereof to be in contact with the collar portion 37b, of the grommet 37, is integrally provided in a protruding manner. The supporting protrusion 30; which is inserted though the insertion hole 38, is integrally provided onto the tip of the contacting protrusion 30b in a protruding manner. In addition, the supporting protrusion 30c is formed into a shape which has a circular cross section with such a diameter that the supporting protrusion 30c comes into elastic contact with the both inner faces of the oval insertion hole 38 in the minor axis direction thereof.

The third supporting portion S3 is set on the rear end side of the cover 30 in the lower portion thereof, the portion being slightly higher than the first supporting portion S1. On the other hand, in the rear portion of the crankcase 18, provided is a gear case portion 18b which houses a bevel gear in a state where the gear case portion 18b is covered with the rear portion of the cover 30, the bevel gear being provided on the front end of the drive shaft 22 in a state where the bevel gear engages a bevel gear which is provided on an output shaft of the transmission. The stay 32, which is formed in a vertically elongated shape, is attached to the gear case portion 18b.

The upper portion of the stay 32 is positioned and supported by the gear case portion 18b via a positioning pin 39. The middle portion of the stay 32 in the vertical direction is fastened to the gear case portion 18b via a screw member 40. The bottom portion of the stay 32 is extended below the gear case portion 18b, and the grommet 41 is fitted into the bottom portion of the stay 32, the grommet 41 being formed of elastic material in a cylindrical shape in a state where the grommet 41 has, on both ends thereof, collar portions 41a and 41b which engage with both sides of the stay 32.

On the other hand, on the inner face of the cover 30 in the third supporting portion S3, a contacting protrusion 30d, which allows the tip thereof to be in contact with the collar portion 41b of the grommet 41, is integrally provided in a protruding manner. The supporting protrusion 30e, which is elastically inserted into the grommet 41, is integrally provided onto the tip of the contacting protrusion 30d in a protruding manner. That is, an annular recess 42 is formed around the outer periphery of the supporting protrusion 30e, and the supporting protrusion 30e is elastically inserted into the grommet 41 in a way that the grommet 41 is engaged with the annular recess 42. Thus, the cover 30 is elastically supported by the stay 32 in the third supporting portion S3.

Incidentally, in at least one supporting portion out of the second and third supporting portions S2 and S3, which is the second supporting portion S2 in this example, coming-off prevention means 45, which keeps the elastically inserted state of the supporting protrusion 30c in the grommet 37, is provided between the supporting protrusion 30c and the grommet 37. The coming-off prevention means 45 is formed by inserting a pin 47, which engages with the collar portion 37a of the grommet 37 with a washer 46 interposed therebetween, into a portion of the supporting protrusion 30c, the portion protruding from the grommet 37.

In addition, in the portion of the supporting protrusion 30c protruding from the grommet 37, a through hole 48 which runs along a diameter of the portion is provided. The pin 47 is one which has heretofore been well known, which has a insertion stick portion 47a which linearly extends so that the insertion stick portion 47a can be inserted through the through hole 48, and can come into contact with and engage with the washer 46 from the side opposite to the grommet 37; and an engaging portion 47b which is integrally joined to an end of the insertion stick portion 47a so that the engaging portion 47b elastically engages with a part of the outer periphery of the supporting protrusion 30c.

Next, a description will be given of operations of the first example. The cover 30 which covers a part of the crankcase 18 in the power unit P is supported by the crankcase 18 in the power unit P, the crankcase cover 31 which covers a part of the left side face of the crankcase 18, and the stay 32 which is attached to the crankcase 18 in the first to third supporting portions S1 to S3. In the first supporting portion S1, which is at least one of the first to third supporting portions S1 to S3, the cover 30 is elastically supported, via the grommet 36, by the bolt 33, which is inserted into the cover 30 and is screwed onto the attachment boss 18a of the crankcase 18 in the power unit P. In the second and third supporting portions S2 and S3, which are the remaining supporting portions out of the first to third supporting portions S1 to S3 with the supporting portion S1 in which the bolt 33 is disposed excluded, supporting protrusions 30c and 30e, which are provided, in a protruding manner, to the cover 30, are elastically inserted into grommets 37 and 41, which are fitted into the crankcase 18 and the stay 32, respectively. In the second supporting portion S2, which is at least one of the second and third supporting portions S2 and S3, the coming-off prevention means 45 is provided between the supporting protrusion 30c and the grommet 37, the coming-off prevention means 45 keeping the elastically inserted state of the supporting protrusion 30c in the grommet 37.

In the first supporting portion S1, which is one of the first to third supporting portions S1 to S3 which are set on the cover 30, the cover 30 is attached to the crankcase 18 via the bolt 33. In the second and third supporting portions S2 and S3, which are the remaining supporting portions, the supporting protrusions 30c and 30e are elastically inserted into the grommets 37 and 41, respectively. As a result of this structure, the work of attaching the cover 30 is made easy compared to one which requires the work of fastening for all of the supporting portions S1 to S3.

In addition, when the cover 30 is removed, it is necessary to loosen the bolt 33, while, in the second supporting portion S2, which is at least one supporting portion out of the second and third supporting portions S2 and S3, the elastically inserted state of the supporting protrusion 30c in the grommet 37 is kept by the coming-off prevention means 45. Accordingly, it can be avoided that the cover 30 easily comes off by a small external force or the like.

Moreover, since the cover 30 is elastically supported by the bolt 33 via the grommet 36 also in the first supporting portion S1, even when the cover 30 is made of synthetic resin as in the case of this first example, it is made possible to prevent the occurrence of deformation of the cover 30 due to fastening of the bolt 33.

Furthermore, the first supporting portion S1 in which the bolt 33 is disposed is set in the lower portion of the cover 30, and, in the second and third supporting portions S2 and S3, which are set above the first supporting portion S1, the supporting protrusions 30c and 30e are provided onto the inner surface of the cover 30 in a protruding manner, and the grommets 37 and 41 are fitted into the bracket 31a of the crankcase cover 31 and the stay 32, respectively. Accordingly, the supporting portions of the cover 30 are made difficult to see from the outside by disposing the bolt 33, which can be seen from the outside, in the lower portion of the cover 30, and by providing the supporting protrusions 30c and 30e onto the upper inner surface of the cover 30 in a protruding manner. Thus, it is made possible to improve the external appearance.

Additionally, the coming-off prevention means 45 is formed by inserting the pin 47, which engages with the grommet 37 with a washer 46 interposed therebetween, into a portion of the supporting protrusion 30c, the portion protruding from the grommet 37, in the second supporting portion S2. Thus, the coming-off prevention means 45 can be constructed simply by simple parts.

Figure 6:
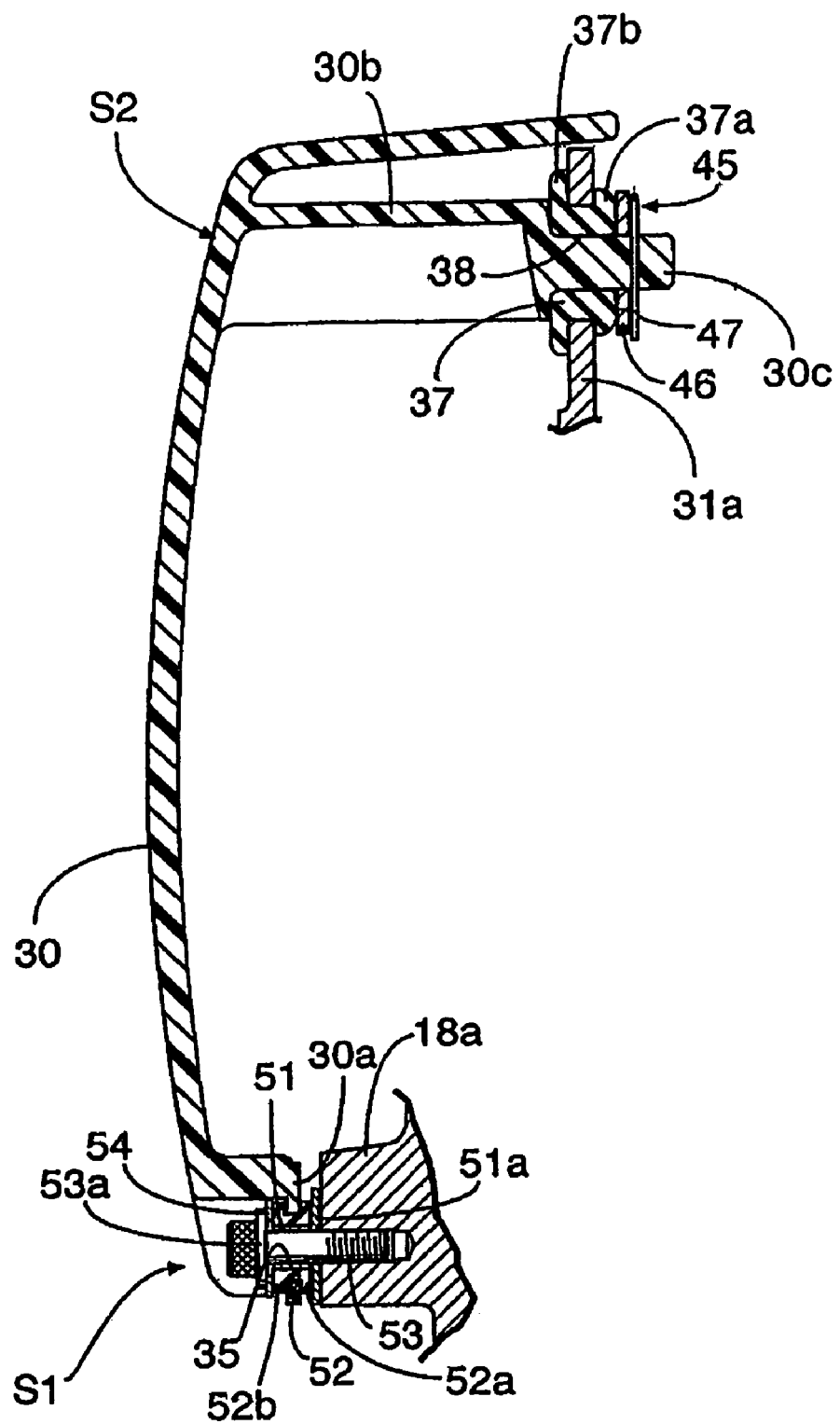
FIG. 6 is a cross section for a second example corresponding to FIG. 3.

FIG. 6 shows a second example of the present invention. The portions corresponding to those of the above first example are designated by the same reference numerals.

In the lower portion of the cover 30 in the first supporting portion S1, the support portion 30a is provided in a way that a part of the cover 30 is recessed inward. The support portion 30a is provided with the support hole 35. Inserted into the support hole 35 are a cylindrical collar 51, which has, on one end thereof, a collar portion 51a coming into contact with the tip of the attachment boss 18a which is provided to the crankcase 18; and a grommet 52 made of elastic material which surrounds the collar 51. The grommet 52 is formed into a cylindrical shape with a collar portion 52a on one end of the grommet 52, the collar portion 52a being sandwiched between the collar portion 51a and the support portion 30a, and with a collar portion 52b on the other end of the grommet 52, the collar portion 52b facing the support portion 30a from the outside.

A bolt 53 which is inserted into the collar 51 is screwed onto the attachment boss 18a. A flange portion 53a, which sandwiches a washer 54 between the flange portion 53a and the collar portion 52b of the grommet 52, is integrally provided to the bolt 53.

Also with the second example, in the first supporting portion S1, the cover 30 is elastically supported, via the grommet 52, by the bolt 53, which is inserted into the cover 30 and is screwed onto the attachment boss 18a. Thus, the same effects as those of the above first example can be brought about.

Hereinbefore, the examples of the present invention have been described. However, the present invention is not limited to the above described examples, and various design changes can be performed without departing from the scope of the present invention recited in the claims.

We claim:

1. A cover which covers a part of a power unit mounted on a frame of a motorcycle, the cover having a plurality of supporting portions supporting the cover on the power unit;

for at least one of the supporting portions, the cover is elastically supported by a bolt which is disposed in the supporting portion and connected to the power unit; and for each of the other supporting portions, a supporting protrusion that protrudes from the cover is elastically inserted into an elastic member connected to the power unit.

2. The cover according to claim 1, for at least one of the other supporting portions, coming-off prevention means is provided between the supporting protrusion and the elastic member, the coming-off prevention means keeping the elastically inserted state of the supporting protrusion in the elastic member.

3. The cover according to claim 1, wherein the supporting portion in which the bolt is disposed is set in a lower portion of the cover, which covers a lower portion of the power unit; and the other supporting portions are positioned above the supporting portion in which the bolt is disposed, and the supporting protrusions protrude from an inner surface of the cover, and the elastic member is fitted into the power unit or into a supporting member connected to the power unit.

4. The cover according to claim 2, wherein the coming-off prevention means comprises a pin, inserted into a portion of the supporting protrusion and which engages with the elastic member, and the portion protrudes from the elastic member.

5. The cover of claim 1, further comprising a supporting member connected to the power unit and wherein one of said elastic members is secured to said supporting member.

* * * * *